(No Model.)
W. W. SMALLEY.
JOURNAL BOX.
No. 366,981. Patented July 19, 1887.
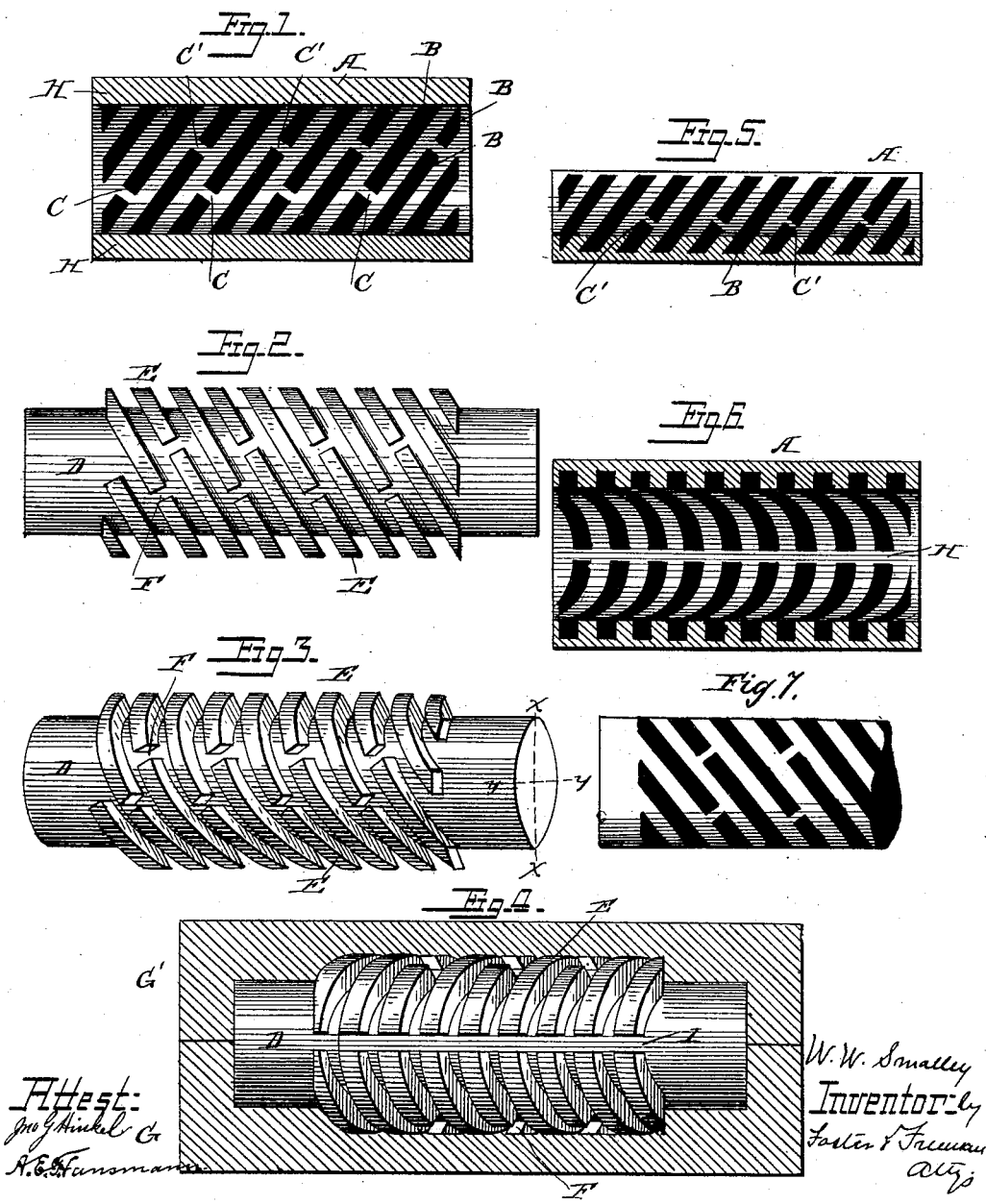

United States Patent Office.

WILLIAM W. SMALLEY, OF BOUND BROOK, ASSIGNOR TO THE GRAPHITE LUBRICATING COMPANY, OF JERSEY CITY, NEW JERSEY.

JOURNAL-BOX.

SPECIFICATION forming part of Letters Patent No. 366,981, dated July 19, 1887.

Application filed August 25, 1886. Serial No. 211,835. (No model.)

*To all whom it may concern:*

Be it known that I, WILLIAM W. SMALLEY, a citizen of the United States, and a resident of Bound Brook, Somerset county, New Jersey, have invented certain new and useful Improvements in Journal-Bearings, of which the following is a specification.

My invention relates to journals and journal-boxes, and more particularly to that class of journals and journal-boxes which are provided with pockets or recesses filled with some anti-friction composition; and it has for its object to improve the construction of such articles so that they are better adapted to receive and retain the composition in place, whether used as full cylinder-bearings or divided cylinder-bearings.

To these ends my invention consists in subdividing the pockets or recesses by transverse stops and in making a cylinder-bearing with two or more continuous longitudinal strips or bars extending throughout the same, which are not cut or recessed, so that the cylinder-bearing may be divided longitudinally, as hereinafter stated.

Referring to the accompanying drawings for a more thorough description of my invention, Figure 1 is a plan view of one form of bearing, showing my improvement. Figs. 2 and 3 are respectively side and perspective views of the core. Fig. 4 is a sectional view of the core and box. Fig. 5 is a section through the bearing, showing the inclined sides of the pockets. Fig. 6 is a section through the bearing, taken on a line at right angles to the line on which Fig. 1 is taken. Fig. 7 is a side view showing my invention applied to a journal.

The journal or bearing may be of any of the usual forms, and I have selected one convenient form to illustrate my improvements; and the first peculiarity consists in the arrangement of the receptacles or pockets within which is contained the anti-friction substance which serves as a lubricant to prevent friction and wear.

Heretofore pockets have been made in the form of screw-threads or radial openings or recesses; but it has been found very difficult, if not impossible, to practically make such pockets, owing to the difficulty of withdrawing the core from the mold without destroying the latter, and such recesses have had to be cut by milling or drilling, which is expensive and impracticable. In Patent No. 209,081 there is described and shown a practical way of molding, so that journals and bearings having pockets may be cast, and in that patent the grooves, recesses, or pockets were continuous, and while these pockets may be filled and used and the material will be retained therein, I have found that by subdividing such grooves or recesses by transverse stops, preferably arranged at right angles to the sides or trend of the grooves, and arranging the stops in each alternate groove in a line, the lubricating material may be more effectually applied to and retained in the pockets, and consequently producing a better and more lasting bearing.

In Fig. 1, A is the metal of the bearing, having the grooves B, which are inclined relatively to the longitudinal axis of the bearing and are filled with the lubricating material, the stops C C′ being arranged to subdivide the grooves into pockets, and are arranged at right angles to the sides of the grooves, as shown, while the stops in each alternate groove are in a line. The general form and arrangement of these pockets will be best understood by referring to Figs. 2 and 3, which illustrate the form of core used in forming a bearing such as is shown in Fig. 1. The cylindrical body of the core D has projections E, which correspond, essentially, to parts of a series of parallel disks through which the body D of the core may be considered as extending, the centers of the disks coinciding with the axis of the body, and each disk being at an angle to the said axis, as shown. The recesses F to form the stops are arranged at right angles to the projections E. When the bearing is cast from such a core, it will have a central longitudinal cylindrical opening or bore and a series of pockets parallel to each other, but each at an angle to the axis. By this arrangement a core can be made in the ordinary two-part core-box, as shown in Fig. 4, which core will draw readily without liability of breaking. Thus the two parts G G′ of the core-box can be separated from the core, inasmuch as the sides of the projections E coincide with vertical planes at right angles to the plane of the boxes. It will be observed that in order to accomplish this result care must be exercised in placing the core in the box properly. For instance, if the sections of the box were formed to coincide to that portion of the core upon one side of the line $y$, Fig. 3, the core would not draw from the box; but by making each portion of the box coincide with one of the parts of the core divided on the line $x$ the core can readily be drawn, and by so using the core I am enabled to cast in one piece a complete bearing having the grooves or pockets for the composition, as shown, thus avoiding all cutting and drilling.

It will be observed that the sides of each pocket in the bearing are inclined to the bore, as shown more clearly in Fig. 5, thereby providing a sort of undercut pocket well adapted for the retention of the lubricating material.

By the use of the stops in the channels I am enabled to more compactly fill the pockets, as the material may be thoroughly pressed therein by mandrels, the twisting and screwing of which in forcing the material solidly in place is liable to dislodge some portions thereof without the stops which effectually prevent it. Moreover, in actual use of the bearing, if any foreign substance gets lodged in the box or the lubricant adheres to the revolving surface, the stops check it, while the stops act as braces to the sides of the pockets, and I can therefore make the metal surfaces narrower and increase the width of the lubricant-surface, and the case of the bearing may be made thinner, decreasing its weight without decreasing its strength.

It is often desirable to make half or sectional bearings, and it has been found expedient to cast a full cylinder and cut it into the desired sections; but the cutting was liable to disturb the graphite lubricant in the pockets, and in order to avoid this difficulty I cast the cylinder with continuous longitudinal strips of metal, H, and then divide the cylinder by any suitable instruments or tools upon or through this strip, thereby leaving the sections with closed ends, as shown in Fig. 1. In order to do this, it is only necessary to cut one or more grooves, as may be desired, in the core, as shown at I, Fig. 4, and the result will be the continuous bars or ribs H when the casting is made, and the cylinder may then be cut without disturbing the graphite composition, and each section will have a sound and well-finished edge. Furthermore, the faces may be cut or filed to adjust the bearing without disturbing the graphite.

I am aware that journal-bearings have been formed with separate cavities adapted to receive lubricating material. I am also aware that journal-boxes have been provided with metallic bearing-strips arranged on straight lines longitudinally to the axis thereof, there being formed in each such strip a series of recesses or slots adapted to receive lubricating material; but I believe that I am the first to have invented a construction wherein the grooves for the lubricating material pass around the longitudinal axis of the bearing, either spirally or directly, and to have divided such grooves into pockets in the manner set forth.

The advantages incident to arranging the grooves spirally around the journal-bearing are, among other things, that every part of the shaft revolving therein is brought into intimate contact with the lubricating material at every revolution.

The bearing which I have described is "integral," which term I use to distinguish my invention from such journals as are made of separate parts assembled together and finally united into a whole by having metal cast around them, as in the construction just disclaimed, in my journal the grooves being formed in the integral journal itself, while in such earlier device the lubricant-pockets are formed in separate strips, afterward united into a whole.

While I have thus specifically described my invention as applied to a cylindrical or sectional bearing, it will be understood that it may be equally well applied to journals and bearings of all shapes and sorts, and while I have shown the stops as arranged in alternate rows in the grooves it will be understood that this is not an essential feature of my invention, but that they may be arranged in many ways to form pockets of various sizes without departing from my invention.

What I claim is—

1. An integral journal or bearing having grooves therein extending around the longitudinal axis thereof, said grooves being divided into pockets for the reception and retention of the lubricant, substantially as described.

2. An integral bearing having internal parallel recesses with undercut sides extending around the longitudinal axis thereof, said recesses being divided into pockets for the reception and retention of the lubricating material, substantially as described.

3. An integral bearing having recesses or pockets therein for the reception of the lubricant and having the continuous longitudinal strips or bars H, through which the bearing may be divided, substantially as described.

4. A cast journal-bearing having inclined recesses passing around its longitudinal axis, said recesses being divided into pockets by stops arranged at right angles to the sides of the grooves, substantially as described.

5. A journal-bearing having inclined recesses passing around its longitudinal axis, said recesses being divided into pockets by stops C C', the stops in the alternate grooves being in line with each other, substantially as described.

In testimony whereof I have signed my name to this specification in the presence of two subscribing witnesses.

WILLIAM W. SMALLEY.

Witnesses:
 HUGH K. GASTON,
 C. VANDERBEEK.